United States Patent [19]
Simmons et al.

[11] 3,761,043
[45] Sept. 25, 1973

[54] METHOD AND APPARATUS FOR PACKING A PARACHUTE INTO A PROJECTILE

[76] Inventors: Björn Herman Olof Simmons, Hertig Carls Alle 38; Karl Ingemar Wenzel Johansson, Viaduktgatan 19, both of Kariskoga, Sweden

[22] Filed: May 31, 1972

[21] Appl. No.: 258,169

[30] Foreign Application Priority Data
June 24, 1971 Sweden.............................. 8233/71

[52] U.S. Cl................ 244/138 R, 244/148, 244/149
[51] Int. Cl....................... B64d 17/44, B64d 17/46
[58] Field of Search.................... 244/138, 147, 148, 244/149; 9/8 R

[56] References Cited
UNITED STATES PATENTS
2,737,359  3/1956  Brown............................... 244/149
3,061,249  10/1962  Chipperfield................... 244/138 R

*Primary Examiner*—Milton Buchler
*Assistant Examiner*—Carl A. Rutledge
*Attorney*—William D. Hall et al.

[57] ABSTRACT

A parachute is packed into a tubular recess within a projectile casing by urging said parachute, along with a retaining member, through a tubular channel communicating with said recess. The retaining member includes resilient detents which are adapted to engage an abutment located adjacent the upper end of the tubular recess, whereby said retaining member is automatically latched into place when the parachute has been fully compressed into said recess and retains the parachute within the recess.

12 Claims, 2 Drawing Figures

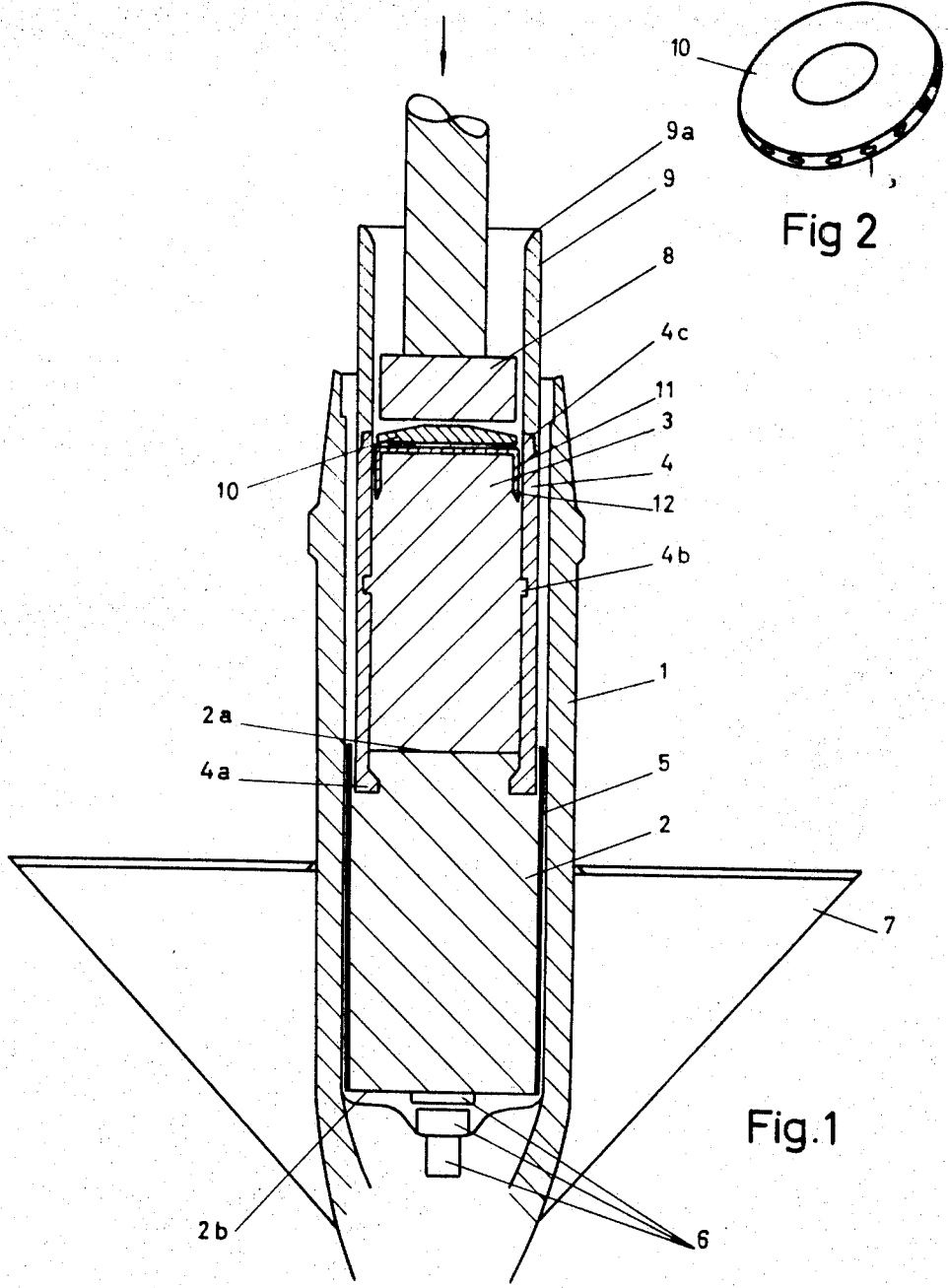

METHOD AND APPARATUS FOR PACKING A PARACHUTE INTO A PROJECTILE

The present invention relates to a method, and to a device suitable for carrying out the method, of packing a parachute into a first space allotted to the parachute and located in a carrier taking the form of a projectile, rocket or the like, where the parachute when being packed encloses a quantity of air which causes its volume to exceed the volume of the space. The first space can be increased by a second space, formed e.g. by means of a tubular unit which can be attached to one end of the carrier, the parachute with the enclosed quantity of air then first being inserted into said two spaces and thereafter, by means of a pressing tool, being compressed into place in the first space. The expression "parachute" here also includes a casing which as a rule encloses the parachute.

In all ammunition, it is a desire to be able to allot as great a portion as possible of the inside of the carrier in question to the payload which is to be carried. This means that if the carrier carries a charge in a parachute, the space for the parachute should be as small as possible. This in turn has involved problems since the parachute, before being packed, encloses a quantity of air which is difficult to eliminate and which makes its volume substantially greater than the volume of the space allotted to it. For the purpose of eliminating the enclosed quantity of air, a pressing tool is customarily used, which is so arranged that when the parachute is being compressed it will permit air to escape during the course of the compression. However, it is difficult to eliminate all of the air in the parachute in this way in a short time, and any remaining air will cause the parachute to expand as soon as the pressing tool is removed, the size and speed of the expansion being directly dependent upon the time during which the parachute has been kept compressed.

Consequently, it has hitherto been necessary to allow the pressing tool to actuate the parachute for a time of not less than 2 hours, and in spite of this the expansion of the parachute has taken place so rapidly and has been of such an extent that, only by acting extremely rapidly, has it been possible to insert an inner part into the carrier to retain the parachute in its space.

The present invention parking a method and a device which reduces the aforementioned parking, time of approx. 2 hours to the time it takes for the pressing tool to compress the parachute in its allotted space, i.e. only a few seconds. Further, the problem of rapidly inserting a part to retain the parachute in place is eliminated.

SUMMARY OF THE INVENTION

The feature that can mainly be considered to characterize a method according to the invention is that, before the compression of the parachute, a part which can be inserted into the second space and which can be secured to a unit in the carrier is positioned between the parachute and the pressing tool; and movement of blocking members located on the part and/or on the unit is initiated when the part, during the compression, reaches a position where the parachute is fully pressed into its allotted first space. The parachute is accordingly retained in the first space when the pressing tool is removed.

A device for carrying out said method is characterized by a part which can be inserted in the second space and which can be secured to a unit in the carrier, the part being placed between the parachute and the pressing tool before the compression of the parachute. The part, in order to be secured in the unit, is arranged to initiate movement of blocking members located on the part and/or on the unit when, during the compression, the part reaches a position where the parachute is pressed into the first space so that the secured part then retains the parachute in its first space when the pressing tool has been removed.

BRIEF DESCRIPTION OF THE DRAWINGS

An embodiment of a device which utilizes the method of the present invention will now be described with reference to the attached drawing, in which FIG. 1 is a vertical view in cross-section of a device according to the invention and an associated carrier, and FIG. 2 shows in perspective an embodiment of the device in question.

DESCRIPTION OF THE PREFERRED EMBODIMENTS

In FIG. 1, a casing of a carrier in the form of a projectile is designated 1. The projectile is designed to carry a payload in the form of a charge 2 of some kind, e.g. a flare or a smoke charge. At one end of the charge, adjacent one of its surfaces 2a, a parachute 3 is connected, which parachute in the example of the embodiment is enclosed in a casing made of a suitable textile material. In the projectile the parachute is enclosed in supporting parts 4 containing the parachute. These supporting parts together form a tubular cylindrical member which is split in its longitudinal direction, which is also the longitudinal direction of the carrier. One of the ends of the supporting parts 4 is provided with cleats or flange-formed edges 4a, turned inwards, which engage in corresponding recesses in the charge 2. Said cleats or edges are kept pressed into the recesses by means of a container 5 which encloses the charge from the end surface 2b of the charge remote from the parachute 3 and over the envelope surface of the charge. The charge, supporting parts and container will thus form a unit located inside the carrier. The charge is also provided with ignition charges 6. Further, the projectile is set up in a rack or holder 7 which permits the pressing tool 8 to be utilized for compressing the parachute 3.

A first space, allotted for storage of parachute 3, is located between the end surface 2a of the charge and recesses 4b in the supporting parts 4. This space can be increased by a second space, which in the example of the embodiment can be considered to consist of the remaining space inside the supporting parts, i.e. the space between the ends 4c of these parts and said recesses 4b, as well as the space in a tubular cylindrical unit 9 which can be attached to one end of the projectile by being placed on same. Said first and second spaces are then assumed to have such a volume together that there will be room for the parachute with the quantity of air enclosed in it. Before the compression of the parachute, a part 10 which can be secured to a unit (the supporting parts 4) contained in the carrier, and which can be inserted into the second space, is positioned between the pressing tool 8 and parachute 3. The part 10 is disc-formed and supports resiliently movable detent elements not shown in FIG. 1 in the form of balls, springs (e.g. expanding springs), cleats etc. which can spring in and out, comprising blocking or latching members which are intended to coact with the recesses 4b so that the part 10 can automatically be secured to the supporting parts 4. The movable latching or detent elements in part 10 are not shown in the FIG. 1 because they are pressed in by the limiting surfaces of the second space. At its free end, the cylindrical unit 9 has chamfers 9a, to facilitate the insertion of the part 10 in the second space.

When the tool 8 is pressed downwards, in the direction of the arrow, compression of the parachute 3 takes place. When the part 10 has reached a position where the parachute is fully pressed into the first space, said latching elements spring out into the recesses 4b, after which the part 10 will retain the parachute in its space when the pressing tool 8 is removed. The part 10 and the pressing tool 8 are provided with channels or are dimensioned in such a way in relation to the spaces that the air enclosed in the parachute is allowed to pass through. In order to prevent the textile material from expanding into the recesses 4b and being damaged by the blocking members during the compression of the parachute, a cup-shaped unit 11 is positioned between the part 10 and the parachute, which unit 11 has an edge 12 which can penetrate between the inner surface of the assembled parts 4 and the parachute. The edge 12 can be provided with a chamfer that facilitates the penetration. The unit 11 need not have the form of a cup, and the edge 12, for instance as an alternative, can be located on the part 10.

In the example of the embodiment shown in FIG. 1, the space between the ends 4c of the supporting parts and the recesses 4b of the same parts is utilized for a brake parachute, and the part 10 can be utilized as a fastening member for said brake parachute, whereby a simple solution is obtained for both of these functions. The part 10 can then also be provided with a ball bearing, not shown, placed in the center of the part to which the brake parachute can be fastened. The brake parachute can be inserted in the corresponding way as the parachute 3 and can be retained in place by a part corresponding to the part 10 which, as in the case of the fastening members for this additional part, is not shown in the figures.

FIG. 2 illustrates one example of detent members in the part 10 taking the form of peripherally disposed balls 13 which can spring in and out.

The method of packing the parachute in the embodiment according to FIG. 1 takes place in such a way that a first space alloted to a parachute 3 is increased by a second space which is achieved with the aid of the cylindrical part 9. The parachute 3 with an enclosed quantity of air is packed by hand into the first and second spaces, after which a part 10 which can be secured to a unit (the supporting parts 4) in the carrier and which can be inserted into the second space, is positioned between the parachute 3 and a pressing tool 8. Thereafter the pressing tool is actuated, and compression of the parachute takes place until the part 10 has reached a position in which the blocking members on the part 10 and/or on the unit are actuated to secure the part 10 in position relative to the supporting parts 4 with the parachute being fully pressed into the first space. The parachute is thereafter retained in position by the part 10 when the pressing tool is removed. The method described can appropriately also include a step in which a cup-shaped member, having an edge that can be inserted between the inside of the unit and the parachute, is applied before the compression of the part 10 and the parachute.

The invention is not limited to the embodiments shown above as examples, but can also be subject to modifications within the scope of the following claims. Thus, the movable elements or blocking members can be placed in the unit 4 and the cooperating recesses can be placed in the part 10. The unit in the carrier, to which the part 10 is to be fastened, can be varied substantially as regards its construction, without influencing the concept of the invention. Further, in certain connections it is possible to omit the tubular unit 9 during the packing operation, e.g. when it is a question of packing many parachutes in a carrier part where the spaces for the other parachutes can be utilized as the second space. Further, the construction of the tubular cylindrical unit 9 can be changed substantially. The invention can also be utilized in carriers provided with only one parachute.

We claim:

1. The method of packing a parachute into an allotted first space within a projectile, which first space is in direct communication with a second space adjacent thereto, comprising the steps of inserting said parachute into at least said second space, placing a retaining member adjacent said parachute at a position in said second space remote from said first space and located between said parachute and a pressing tool, moving said pressing tool into forcible engagement with said retaining member to move said retaining member toward, and to compress said parachute into, said first space, latching said retaining member to an interior portion of said projectile at a position between said first and second spaces immediately after said parachute has been fully compressed into said first space, and thereafter disengaging said pressing tool from said retaining member and withdrawing said pressing tool from said second space to cause said retaining member alone to hold said parachute in its compressed condition entirely within said first space.

2. The method of claim 1 wherein said first space comprises a first recess within the projectile casing, said second space comprising a tubular channel open at both of its ends and communicating at its lower end with the upper end of said recess, said retaining member and pressing tool being initially located adjacent the upper end of said tubular channel and said member being moved, by movement of said pressing tool, through said tubular channel to a position adjacent the upper end of said recess.

3. The method of claim 2 wherein one of the two elements, constituting respectively the interior wall of said projectile casing and the said retaining member, includes a resiliently movable latching element, and the other of said two elements includes a structure adapted to engage with said latching element, said latching step comprising the step of effecting relative motion between said elements until said latching element and said structure automatically engage one another.

4. The method of claim 3 including the step of positioning an element, having a depending edge separating said parachute from the interior wall of said casing, over one end of said parachute between said parachute and said retaining member prior to moving said pressing tool into engagement with said retaining member, said depending edge being moved through said tubular channel along with said retaining member to prevent said parachute from impeding said latching step.

5. The method of claim 3 including the step of removably placing a tubular element on one end of said projectile casing to form said second space.

6. A parachute packing device for use with a projectile casing having an open-ended interior tubular recess adapted to receive a parachute, comprising means defining an open-ended tubular channel directly adjacent to and colinear with said tubular recess, first latching means positioned between the adjacent ends of said recess and channel, a parachute located in said tubular channel, a retaining member disposed adjacent said parachute at a position remote from said tubular recess, said retaining member including second latching means engageable with said first latching means, said retaining member and parachute being movable through said tubular channel toward said interior tubular recess until said first and second latching means engage one another to cause said retaining member to hold said parachute compressed entirely within said tubular recess.

7. The device of claim 6 wherein one of said first and second latching means comprises a plurality of resiliently movable detents, and the other of said latching means comprises a surface adapted to engage said detents.

8. The device of claim 7 wherein said retaining element is disk-shaped, said detents comprising a plurality of balls disposed about the periphery of said disk-shaped element.

9. The device of claim 6 wherein said projectile casing contains a charge disposed adjacent one end of said tubular recess at a position remote from said tubular channel, the interior walls of said tubular recess being defined by a longitudinally split tubular element having a portion thereof engaged into said charge.

10. The device of claim 6 including a separator member disposed between said parachute and retaining member and having a depending edge surrounding said parachute between said parachute and the interior walls of said tubular channel, said separator member being movable through said tubular channel, along with said retaining member and parachute, to a position wherein said depending edge is disposed between said parachute and the interior walls of said tubular recess, whereby said separator assures proper engagement between said first and second latching member without interference by said parachute.

11. The device of claim 6 including a further parachute attached to said retaining member for storage within said tubular channel after said first-mentioned parachute has been compressed into said tubular recess.

12. The device of claim 6 wherein said means defining said tubular channel comprises a tubular element adapted to removably engage one end of said projectile casing.

* * * * *